United States Patent [19]

Kirk et al.

[11] 3,788,079

[45] Jan. 29, 1974

[54] METHOD AND APPARATUS FOR COLLECTING A FLOATING LIQUID

[76] Inventors: William P. Kirk, 22 Glenhaven Cir., Saco; Dwight W. Reynolds, RFD 1, Box 49, Pownal, both of Maine

[22] Filed: May 26, 1972

[21] Appl. No.: 257,413

[52] U.S. Cl. ............. 61/1 F, 210/DIG. 21, 210/242
[51] Int. Cl. ............................................. E02b 15/04
[58] Field of Search.. 210/83, 242, DIG. 21; 61/1 F, 61/1 R

[56] References Cited
UNITED STATES PATENTS

| | | | |
|---|---|---|---|
| 3,289,415 | 12/1966 | Merrill | 61/1 R |
| 3,389,559 | 6/1968 | Logan | 210/242 X |
| 3,667,609 | 6/1972 | Daniel | 210/242 |
| 3,653,215 | 4/1972 | Crucet | 210/242 |
| 3,664,504 | 5/1972 | Ayers | 210/242 |

*Primary Examiner*—Samih N. Zaharna
*Assistant Examiner*—T. A. Granger
*Attorney, Agent, or Firm*—Kenway & Jenney

[57] ABSTRACT

A floating liquid such as an oil spill is collected under a sheet with weighted periphery. The sheet is deployed by spreading it horizontally over the liquid surface, after which the periphery submerge, confining and centrally concentrating the liquid. The sheet retains the liquid for subsequent pumping into a vessel.

13 Claims, 9 Drawing Figures

PATENTED JAN 29 1974　　　　　　　　　3,788,079

PATENTED JAN 29 1974  3,788,079

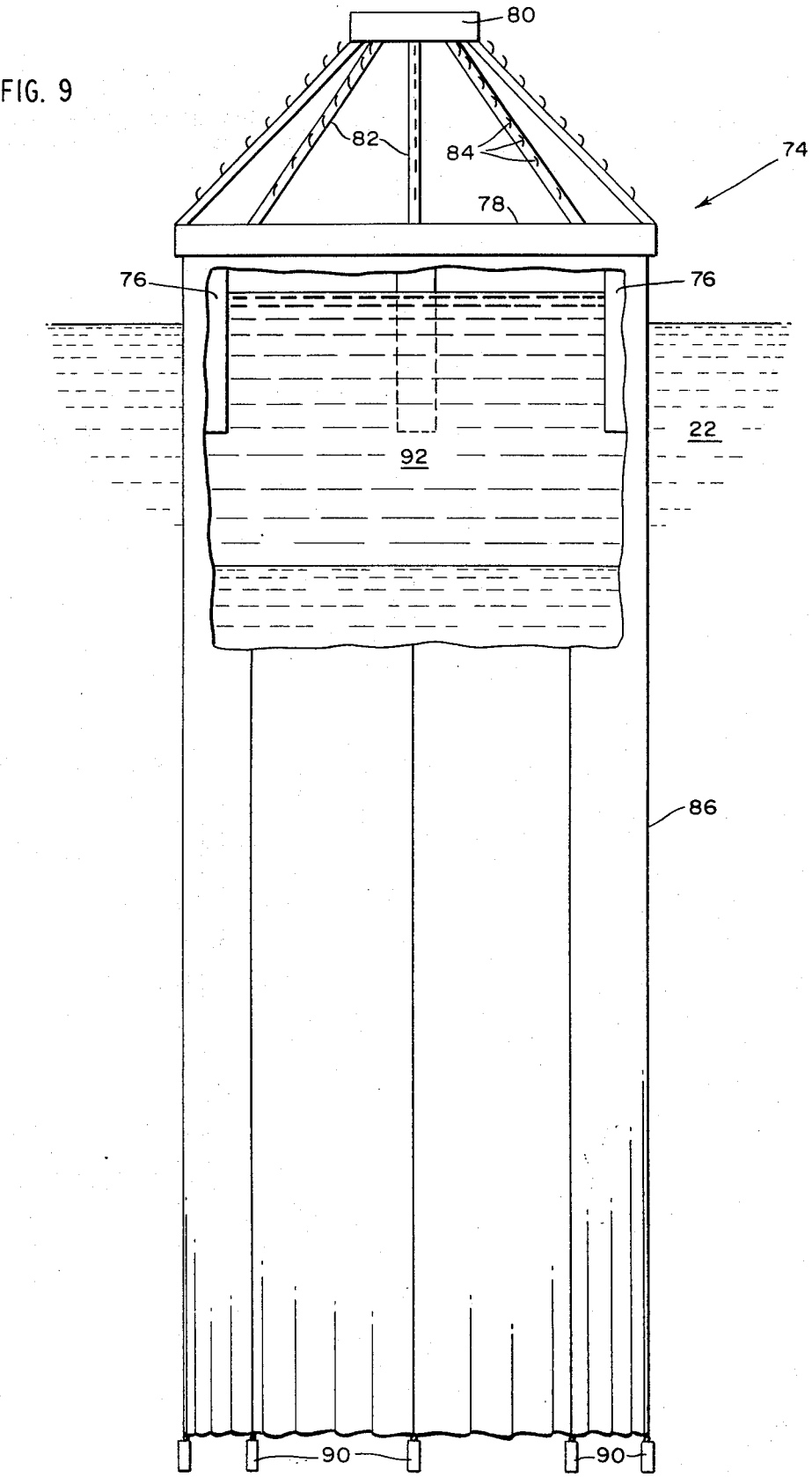

METHOD AND APPARATUS FOR COLLECTING A FLOATING LIQUID

BRIEF SUMMARY OF THE INVENTION

This invention relates generally to techniques for collecting a liquid floating upon another liquid, and more particularly to techniques suitable for collecting oil spills on bodies of water.

The main impetus for research and development in this field presently arises from oil spills from tankers that occur in various different kinds of locations such as harbors, rivers, channels and the open sea.

It has been recognized that damage to beaches and other shores and to wildlife could be greatly minimized if means were provided to collect an oil spill from the surface of the water closely adjacent to the spilling vessel soon after spillage occurs. The oil progressively spreads away from the vessel and the slick becomes correspondingly thinner and of greater surface area at a rate determined by the physical properties of the oil and the water as well as meteorological and hydrodynamic conditions. The most pertinent physical properties of the oil are its viscosity and surface tension, both of which vary with the temperature of the oil, the temperature of the water and the temperature differential between the oil and the water. The surface tension at the oil-water interface tends to restrict the spread of the oil over the water surface; hence, the importance of rapid recovery methods that take advantage of this property. In quiet waters the surface tension can significantly impede the spread of an oil slick of substantial thickness. However, the surface tension is reduced by agitation of the surface caused by wave motion producing white caps and turbulence from any other cause, such as a propellor wake.

The surface current of the water and the wind direction are also important factors controlling the rate and direction of the spread of an oil slick. When there is no wind an oil slick moves at the same speed and direction as the surface current. Surface winds, however, have a strong influence upon the speed and direction of movement of an oil slick, and in fact an oil slick may move down-wind with a velocity component opposed in direction to that of the surface water current. When an oil slick moves downwind, it tends to form into ribbons or rivers of oil, with clear water between the ribbons or rivers. The surface tension at the oil-water interface usually creates a well defined boundary line unless turbulence breaks down the surface tension substantially.

The thickness of an oil slick may have significant variations from its center toward its outer edges. These variations tend to diminish with time and with the movement of the oil in response to wind and water currents.

A variety of devices hitherto proposed for collection and containment of floating oil or the like present substantial difficulties in terms of cost of manufacture, durability of structure, facility of deployment and effectiveness for the intended purpose. Oil booms comprise one variety that functions well, once delivered to the scene and set up, when the wind is calm as well as the water surface. To continue holding the oil, the oil boom must be allowed to move with the water currents. If the relative movement of the boom and the water current exceeds about one knot the water current pulls the oil underneath the boom, thereby destroying its effectiveness.

Turbulence of the water surface, whether caused by the wind or other conditions, also tends to destroy the effectiveness of an oil boom. To contain an oil slick, the boom must follow the contours of the water surface. Therefore, the boom must be sufficiently flexible to follow the wave or chop pattern. The boom must also have sufficient freeboard to prevent the oil from escaping over the top.

The combined wind, wave and current forces acting upon a boom can be of sizable magnitude, which requires the boom to be structurally sturdy. Booms built of practical materials of adequate strength have substantial weight which increases handling difficulties, and the desired flexibility is often sacrificed.

The delivery of booms to the scene of an oil spill and subsequent deployment in an effective manner continue to present major practical problems. Also, there is a problem resulting from the necessity of removing the oil contained by an oil boom as early as possible, before it can escape over or under the boom, and before the boom is rendered ineffective or broken by the forces of the wind and waves.

Another technique for containing and collecting oil spills and the like is exemplified by U.S. Pat. No. 3,389,559 to Logan. This technique employs a thin sheet or membrane that is spread out over a substantial area of the surface with its peripheral edges submerged below the level of the interface between the supporting and floating liquids. Once the sheet or membrane has been thus deployed, it is generally effective to contain the oil beneath it, and this oil can be pumped from beneath the sheet into a recovery vessel.

However, substantial problems also arise in the performance of prior sheet or membrane recovery techniques. The problems include difficulties in obtaining a rapid deployment of the sheet at the site and in stabilizing the sheet in its deployed configuration and protecting it from damage to avoid loss of oil as a result of wind and water currents. The methods hitherto proposed have generally attempted only anchored, fixed-site applications, such as breaks in submerged oil flow lines.

With a view to overcoming the difficulties mentioned above, as well as others attending the application of existing recovery techniques, this invention comprises methods and structures for rapid deployment of a recovery membrane sheet and for subsequently closing or collapsing the membrane or sheet so deployed to concentrate the confined oil or other floating liquid into a more compact mass.

A feature of this invention resides in the fact that such concentration of the confined liquid reduces the vulnerability of the sheet or membrane to turbulence at the water surface, whereby the liquid may be confined for a considerable period of time even in a rough sea before being pumped from beneath the sheet or membrane into a vessel.

The means for deployment of the sheet or membrane may serve plural purposes, including the provision of an anchor to prevent drifting of the oil-containing sheet or membrane to a less accessible location such as shallows, or to a location where tearing of the sheet or membrane upon rocks or other objects may result.

The sheet or membrane with weighted periphery is delivered to the site in a compact, folded condition. As so folded, it is delivered by any one of a variety of suitable means to a position located a short distance above the surface. Propellant means, preferably of an explosive type, are actuated to propel the weighted peripheral edges in generally radial, horizontal directions to spread the sheet. Thereupon, the edges of the sheet fall and submerge into the surface, thereby confining a quantity of the oil or other floating liquid. Further submergence of the peripheral edges is then accompanied by radially inward movements thereof that concentrate the confined oil or other liquid into a more compact mass.

The foregoing changes in the sheet configuration to confine and concentrate the oil or other floating liquid may also be accompanied by venting of air confined beneath the sheet, as by operation of a suitable check valve or the like.

The foregoing and other features of the invention will be more fully understood by reference to the following description of preferred embodiments thereof.

BRIEF DESCRIPTION OF THE DRAWING

FIG. 9 shows the final configuration of the embodiment of FIGS. 7 and 8 with a liquid confined and concentrated beneath the sheet.

DETAILED DESCRIPTION

The embodiment of FIGS. 1 to 6 is preferred for conditions in which rapid delivery of liquid collecting equipment by aerial means is preferred, as contrasted to towing or propulsion on a supporting platform. The particular methods of aerial delivery and means for deployment at the point of delivery are several in number, and include known structures hereinafter referred to as well as other equivalents that will be obvious to one skilled in the art. The embodiment of FIG. 2 comprises a ballistic projectile or bomb 12 including a casing 14 of cylindrical shape having fins 16, whereby the projectile may be dropped from an aircraft or projected from any suitable known type of launcher positioned on shipboard or on the shore, whereby it will fall with a trigger 18 in the nose lowermost and the longitudinal axis of the casing 14 substantially vertical.

Figure 1:
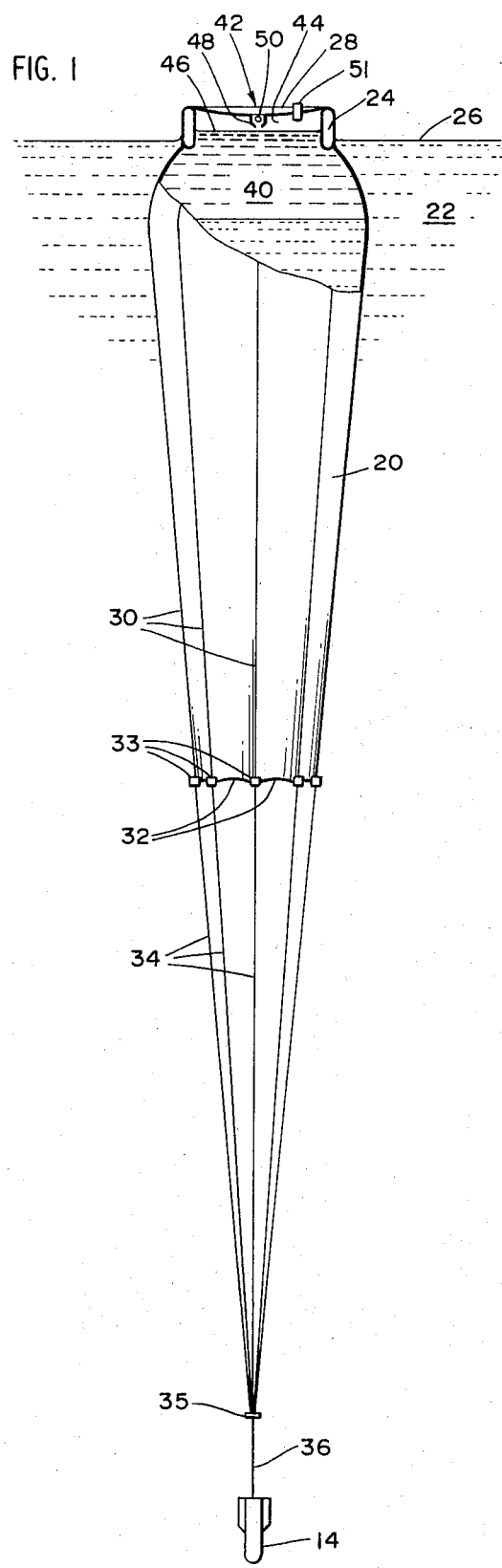
FIG. 1 is an elevation partly in section showing a first embodiment with the sheet in its final configuration.
Figure 2:
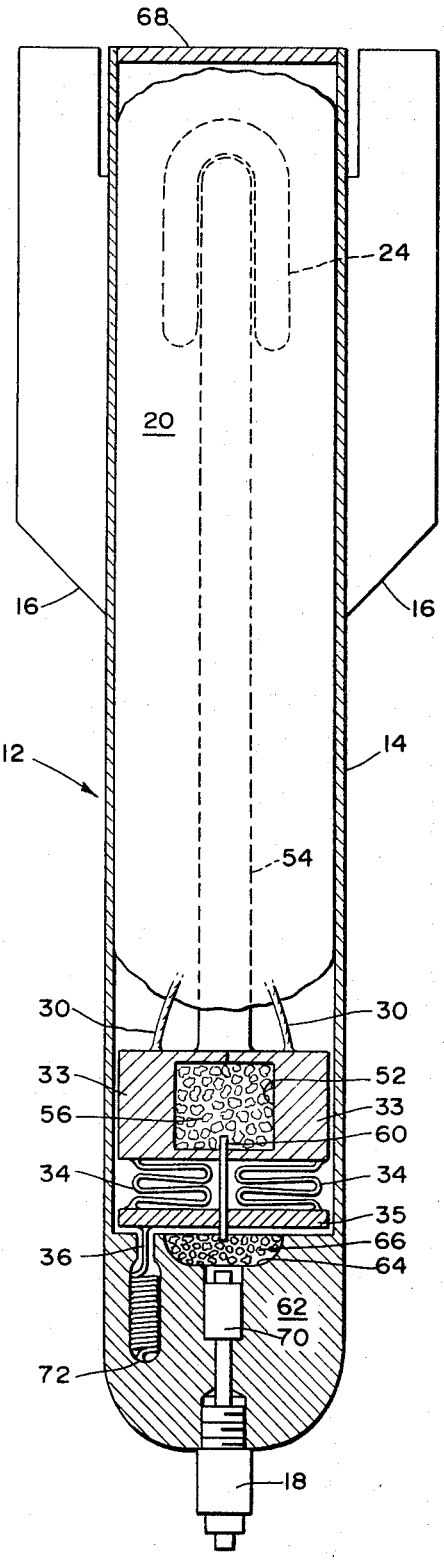
FIG. 2 is a longitudinal elevation in section showing the first embodiment housed within a ballistic projectile or bomb prior to deployment.

A further understanding of details of the projectile of FIG. 2 may be gained by first considering FIG. 1 which shows some of the parts in their ultimate configuration after deployment. A reinforced sheet or membrane 20 of a thin, lightweight, flexible, liquid-impervious character, and preferably but not necessarily of circular shape, is disposed with its central portion at or near the surface of the supporting body of water 22. A ring-shaped flotation collar 24 is located beneath or above the sheet at the surface 26 of the supporting liquid or water, surrounding a central portion 28 of the sheet. The collar 24 may be fabricated of any of the presently available flotation materials, and may comprise rigid or flexible cellular fillers or an inflatable tube. The present embodiment utilizes an inflatable tube, covered with a sturdy, abrasion and puncture resistant woven fabric. Preferably, the collar is secured to the sheet 20 in a manner such that, when floating as illustrated, it supports the central portion 28 slightly above the level of the supporting liquid surface 26.

The sheet 20 may have any desired area which will substantially equal the portion of the area of an oil slick to be confined and collected thereby. In many cases more than one sheet will be deployed. A substantial variety of available sheet materials may be employed, including plastics and rubber in sheet form, and woven or nonwoven fibers impregnated or coated by such materials. One example of a practical embodiment has a fully deployed diameter of 100 feet.

A number of radially extending and uniformly angularly spaced rope strands 30 are secured to the sheet by stitching, tapes or adhesives, preferably from the center of the sheet radially outwardly to its peripheral edges 32, at which points they are attached to weights 33. Rope strands 34 are attached at one end to the weights 33 and at the other end to a plate 35. In the final configuration shown the strands 30 and 34 are generally vertical in orientation with an inward convergence to the plate 35 which is tied to a rope 36 attached at its lower end to the suspended casing 14. The weight of the casing and plate 35 maintains this configuration in conjunction with the weights 33 attached to and uniformly spaced along the peripheral edges of the sheet 20 at the points crossed by the strands 30.

A quantity of oil 40 or other liquid collected from a spill 41, having a specific gravity lower than that of the water 22, is shown confined and concentrated beneath the sheet 20. The buoyancy of the liquid 40 is assisted by that of the flotation collar 24 in maintaining the illustrated configuration.

A check valve 42 is fixed to the central portion 28 of the sheet and permits the escape of air from a space 44 defined by the portion 28 and a surface 46 of the liquid 40. Preferably, this valve is of the floating ball check type commonly employed on snorkel swim masks. A circular seat attached to the sheet has downwardly depending fingers 48 that retain a ball 50. Air in the space 44 can escape between the fingers and out through the circular seat opening, but if the liquid level 46 rises sufficiently to float the ball 50, it closes on the circular seat. This type of valve also allows any sea or rain water on the surface of the portion 28 to drain down into and through the liquid 40.

The central portion 28 of the sheet 20 may be attached to the flotation collar 24 by easily removable stitching of the type used on bags of grain and livestock feeds. This permits partial or complete removal of the central portion 28 from the collar without the use of special tools or sharp instruments at the time the contained liquid 40 is to be pumped out.

Preferably, the flotation collar 24 is constructed of a stronger material than the sheet 20 to minimize damage from floating debris and during the pumping operation. The latter operation is carried out with any suitable known equipment (not shown) having a hose reaching into the body of liquid 40 through the opening left by partial or complete removal of the central portion 28 of the sheet or by connection to a suitable fitting 51 in the sheet.

The structure shown in FIG. 1 is such that it can be allowed to drift for days or even weeks with minimum danger of losing the contained liquid 40. Thus the oil can be collected in a short time after a spill, and a greater length of time is permitted for organizing the oil recovery and pumping operation including the assembly of a suitable fleet of vessels with the necessary pumps, tanks and other equipment. Typically, a number of sheets 20 will be deployed soon after a spill before oil is pumped from any of them.

The casing 14, which is the center weight for the deployed sheet, can also serve as an anchor preventing the sheet from drifting into shoals or shallow water. For example, with a sheet 20 of 100 feet diameter, the casing 14 may be typically suspended approximately 100 feet below the surface 26, and will anchor the sheet upon reaching water of any shallower depth.

The sheet 20, the flotation collar 24 and the strands 30 and 34 are folded and packaged within the casing 14 (FIG. 2) in a manner similar to that employed in military parachute flares. The weights 33 preferably comprise cylindrical segments for efficient assembly, each segment having an inner recess 52. A cylinder 54, filled with gas under pressure for inflating the collar 24, is located in the axis of the casing with the sheet 20 and deflated collar 24 surrounding it. The recesses 52 are mutually contiguous, defining a space which is filled by a propelling charge 56. The plate 35 is circular and is located below the weights 33 and has a hole through which a time delay fuse 60 extends into the propelling charge 56. The casing has a weighted end 62 having a recess 64 containing a quantity of expelling charge 66.

Figure 3:
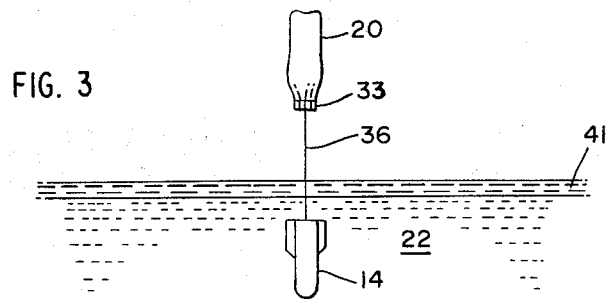
FIGS. 3, 4 and 5 illustrate three successive configurations of the device of FIG. 2 during deployment, as seen in elevation.

The casing is closed at one end by a circular closure plate 68. Upon detonation of the expelling charge 66 a force is exerted upon and distributed by the plate 35 which acts as a baffle plate, driving the weights 33, the cylinder 54 and the folded sheet 20 and collar 24 against the plate 68 which falls away, whereby the expelled parts are ejected upwardly out of the casing as shown in FIG. 3. This is accomplished by means of the trigger 18 which is actuated by impact with the liquid surface to detonate a primer 70, which in turn detonates the expelling charge 66.

The rope 36 is coiled within a cavity 72 in the weighted end 62 of the shell, and is fastened at one end to the end 62 of the shell and at the other end to the plate 35. As the ejected parts move upwardly the rope 36 is extended its full length to the configuration shown in FIG. 3, thereby limiting the upward movement of the expelled parts to a predetermined distance of several feet above the surface 26.

Figure 4:
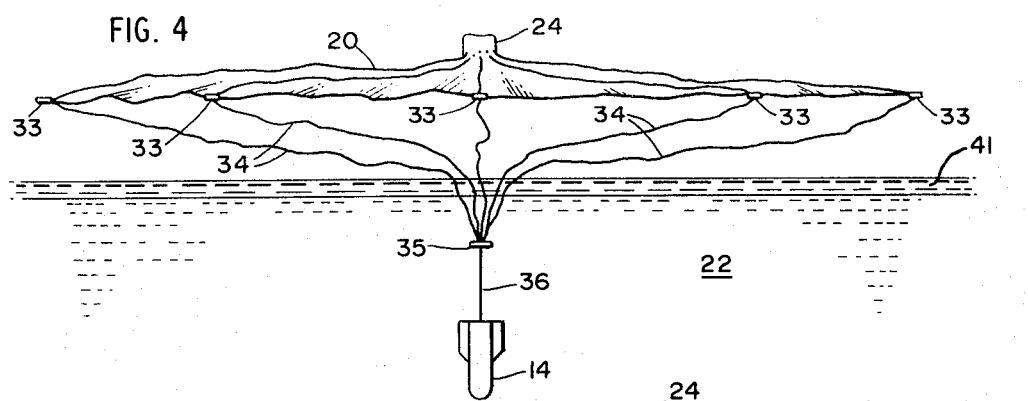

In addition to expelling the sheet 20 and other parts from the shell 14, the expelling charge 66 also initiates the time delay fuse 60, and after a sufficient time permitting the parts to reach the configuration shown in FIG. 3 the propelling charge 56 is detonated, propelling the weights 33 substantially horizontally and radially outward in the manner shown in FIG. 4. Up to this time the flotation collar 24, which in this embodiment is in the shape of a tire inner tube, has been tightly confined within the folded sheet 20, although in communication with the gas in the cylinder 54. As the membrane is deployed, the flotation collar 24 is no longer confined and becomes quickly inflated.

Figure 5:
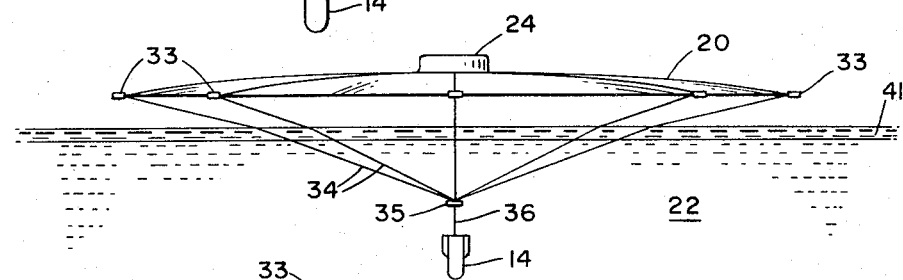
Figure 6:
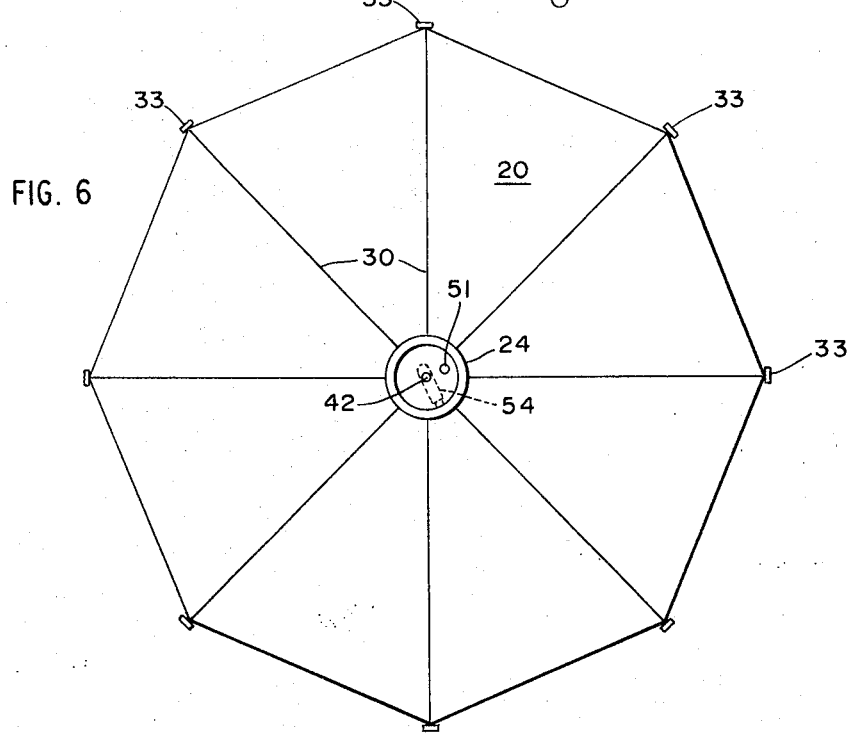
FIG. 6 is a plan view corresponding to FIG. 5.

The strands 34 are sufficiently long to permit the sheet 20 to be spread to its full diameter with the strands each attached at one end to the plate 35 and the rope 36 as shown in FIG. 5, the rope 36 being attached at one end to the shell 14 and at the other end to the plate 35. In the configuration of FIG. 5 the sheet falls to the water surface and the weights 33 immediately sink to submerge the entire periphery of the sheet 20. The shell 14 and the weights 33 descend further into the liquid 22, ultimately causing the floating parts to reach the configuration shown in FIG. 1, described above.

Figure 7:
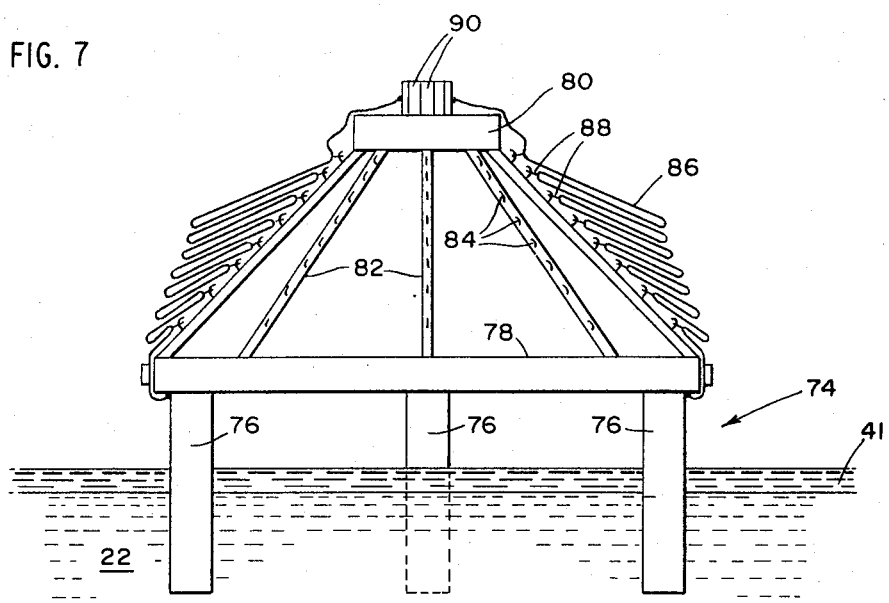
FIG. 7 is an elevation in section showing a second embodiment of the invention having a sheet folded upon a floating platform.
Figure 8:
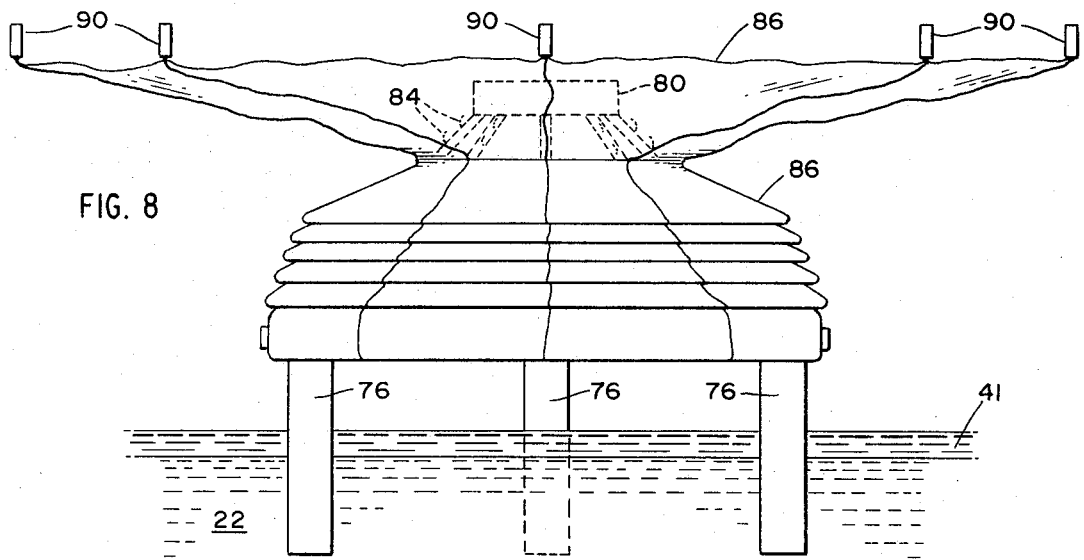
FIG. 8 illustrates the deployment of the sheet from the vessel of FIG. 7.

FIGS. 7, 8 and 9 illustrate a second embodiment of the invention adapted for delivery of the oil recovery sheet to the site of the spill on a floating vehicle. A vessel 74, which may or may not be self-propelled, is floated upon a number of pontoons 76 secured to a first platform 78. A second platform 80 is mounted upon the platform 78 by means of gimbals (not shown) that enable the platform 80 to maintain a constant horizontal orientation. A plurality of radially and downwardly extending support arms 82 are attached to the platform 80, each arm having a number of release hooks 84 along its length, at least some of the hooks having locking means hereinafter further described. A sheet or membrane 86, which is preferably but not necessarily of circular shape, has a plurality of rings 88 and is folded so that the rings can be fitted over the hooks 84. A number of weights 90 preferably of segmental cylindrical shape are located on the top of the platform 80, and each weight is secured to the sheet 86 at a point on its peripheral edge.

Centrally located within the group of weights 90 is a weight propelling charge similar to the charge 56 in FIG. 2. Upon detonation of this charge, the weights are thrown radially and in a generally horizontal direction as shown in FIG. 8 to deploy the sheet 86, the hooks 84 being shaped to release the rings 88 during this movement of the weights. Sufficient force is applied to the weights to extend the sheet 86 to its maximum diameter. However, if it is desired to extend the sheet to only a fraction of this diameter, certain of the lower hooks 84 are locked by any suitable means to prevent the unhooking of the rings 88 attached thereto.

After the sheet 86 has extended to the maximum permitted diameter, the weights 90 fall into the water, submerging the periphery of the sheet 86 and gradually drawing it downwardly and inwardly to the final configuration illustrated in FIG. 9. Thus the sheet 86 first confines and then concentrates a quantity 92 of the floating oil. The device 74 may float in this configuration for any desired length of time until the oil confined therein can be pumped out.

As a variation of the embodiment of FIGS. 7 to 9, the vessel 74 may consist of a ship. The entire length of both sides of the ship may be fitted with one or more specially shaped sheets or membranes which, when deployed, would form a skirt around the ship. The skirt would preferably extend below the keel of the ship. At selected stations along the deck, weights would be attached to the membrane's outer edge. The inboard edge would be attached to the ship at approximately the deck line. To deploy the membrane the weights would be fired away from the side of the ship, spreading the membrane out a predetermined distance from the side of the ship. The weights and the membrane would strike the surface of the water and sink, thus trapping the floating liquid between the membrane and the hull of the ship. To prevent leakage by the membranes at the bow and the stern an arm would be swung down along the hull of the ship, and when in the locked position it would close the gap between the membrane and the hull. The captured fluid could then be pumped back on board the ship or onto a waiting vessel.

We claim:

1. Apparatus for collecting a liquid floating upon the surface of a body of water comprising, in combination,
   a flexible folded sheet impervious to liquid,
   weight means attached to the peripheral edge of said sheet and formed around a space,
   explosive means within said space,
   a support, and
   means for attaching said sheet, weight means and explosive means to the support in an arrangement operative to propel said weight means in a direction away from said support upon detonation of the explosive means, whereby detonation of the explosive means over the floating liquid causes the sheet to be spread over the floating liquid in a horizontal configuration permitting the weight means to submerge said peripheral edge to confine a quantity of the floating liquid under the sheet.

2. Apparatus according to claim 1, in which the support is a floating vessel.

3. Apparatus according to claim 1, including a fitting extending through the sheet for pumping out said confined quantity.

4. Apparatus according to claim 1, including strands connecting the weight means with the support, whereby the weight means are drawn together by the support to concentrate said confined quantity in a more compact mass upon the submergence of the support in the water.

5. Apparatus according to claim 1, in which the support is a closed container having an end detachable therefrom, the sheet being constructed and arranged to be rapidly expelled with said weight means and said explosive means through said detachable end.

6. Apparatus according to claim 5, in which the container is elongate with laterally extending fin means deflectable by an air stream to orient the longitudinal dimension of the container substantially parallel to the air stream with said end facing downstream, whereby when the container falls through the air said end faces vertically upward, whereby the container may be dropped through the air.

7. Apparatus according to claim 1, including flotation means attached to the sheet and constructed and adapted to suspend a central portion thereof over the surface of the confined liquid.

8. Apparatus according to claim 7, including a vent in the suspended central portion of the sheet.

9. Apparatus according to claim 8, in which the vent comprises a check valve.

10. The method of collecting a first liquid initially floating upon a second liquid, the first liquid having an interface with atmospheric air, comprising the steps of
    disposing in the air at a distance vertically spaced above the first liquid a flexible, foled, liquid impervious sheet having weighted peripheral edges surrounding explosive means, and
    with the sheet in said position, detonating said explosive means thereby rapidly unfolding and spreading the sheet by propelling said peripheral edges freely and horizontally in the air over a predetermined area of the first liquid, allowing said peripheral edges of the spread sheet to fall by gravity into the first liquid and to submerge below the interface of the first and second liquids, thereby confining a quantity of the first liquid within said predetermined area between interfaces thereof with the sheet and with the second liquid, whereby said peripheral edges are drawn together as they further submerge by gravity in the second liquid to reduce substantially the horizontal area of said confined quantity and to concentrate it in a more compact mass.

11. The method according to claim 10, including the step of venting air confined under the sheet to the atmosphere.

12. The method according to claim 11, including the step of providing buoyant flotation means to suspend a portion of the sheet above the surface of said confined first liquid.

13. The method of collecting a first liquid initially floating upon a second liquid, the first liquid having an interface with atmospheric air, comprising the steps of
    disposing in the air at a distance vertically spaced above the first liquid a flexible, folded, liquid impervious sheet having central flotation means and weighted peripheral edges, and
    with the sheet in said position, rapidly unfolding and spreading the sheet by propelling said peripheral edges freely away from said flotation means and horizontally in the air over a predetermined area of the first liquid, allowing said peripheral edges of the spread sheet to fall by gravity into the first liquid and to submerge below the interface of the first and second liquids, thereby confining a quantity of the first liquid within said predetermined area between interfaces thereof with the sheet and with the second liquid, whereby said peripheral edges are drawn together as they further submerge by gravity in the second liquid to reduce substantially the horizontal area of said confined quantity and to concentrate it in a more compact, freely floating mass at and beneath said flotation means.

* * * * *